A. S. MARCHUS.
PRESSURE GAUGE.
APPLICATION FILED JUNE 28, 1919.
1,430,174.
Patented Sept. 26, 1922.
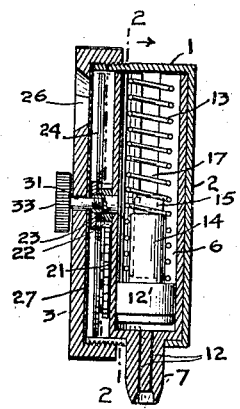
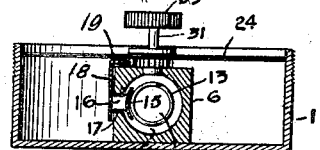
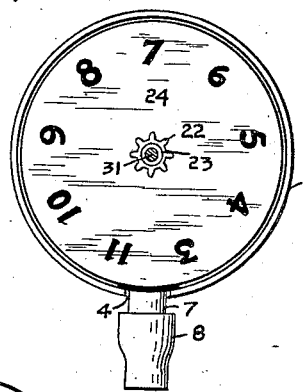
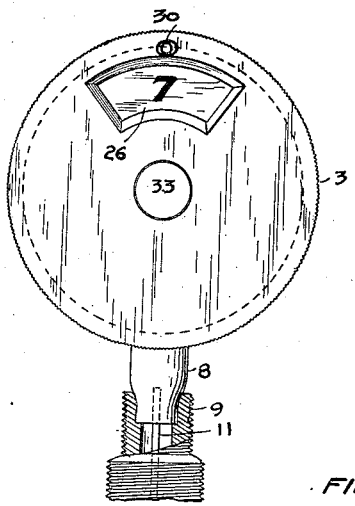
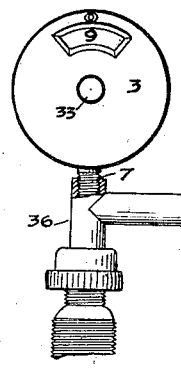
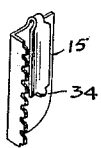
INVENTOR
A. S. MARCHUS
ATT'Y Patented Sept. 26, 1922.

1,430,174

UNITED STATES PATENT OFFICE.

AMOS S. MARCHUS, OF OAKLAND, CALIFORNIA.

PRESSURE GAUGE.

Application filed June 28, 1919. Serial No. 307,278.

*To all whom it may concern:*

Be it known that I, AMOS S. MARCHUS, a citizen of the United States, residing at Oakland, in the county of Alameda and State of California, have invented new and useful Improvements in Pressure Gauges, of which the following is a specification.

The present invention relates to improvements in pressure gauges, the object of the invention being to provide a pressure gauge, which can be easily carried in the pocket of a garment, and which can be applied to the ordinary tire valve to ascertain the magnitude of pressure in the tire, which will not be liable to be broken, and which will be cheap and simple in construction.

In the accompanying drawing, Figure 1 is a vertical transverse section of my improved pressure gauge on the line 1—1 of Figure 2; Figure 2 is a vertical longitudinal section on the line 2—2 of Figure 1; Figure 3 is a section on the line 3—3 of Figure 2; Figure 4 is a front view, the cap being removed; Figure 5 is a front view showing it in use; Figure 6 is a perspective view of a part of the device removed; Figure 7 is a similar view of a modified form of said part; Figure 8 is a view similar to Figure 5, showing its use in another manner.

Referring to the drawing, 1 indicates a cylindrical casing, closed at one end 2, the other open end being closed by a screw cap 3 screwed around said casing. In the cylindrical side of said casing there is formed an opening or recess 4, closed at its inner end, next the closed end 2 of the casing, and open at its outer end, closed by the cap 3. In said casing extends diametrically a hollow block 6, the ends of which, as shown in Figure 2, are convex and of circular curvature to fit snugly against the inner surface of the cylinder 1, there extending from one end of said block through the opening 4 a rounded stud 7, around which is secured a short tube 8 of soft rubber of a greater length than said stud.

In using the gauge, the cap of the tire valve having been unscrewed, the gauge is placed so that a projecting end of the rubber tube 8 is inserted in the tube 9 of the tire valve and so that the stud 7 impinges against the needle 11 which opens the tire valve. In that position, the projecting end of the tube 8 makes an air tight joint with the tube 9 of the tire valve, which is rendered still more tight by the pressure of the air flowing from said tire valve into said tube 8, and pressing the tube 8 outwardly against the surface of the wall of said tube 9. The air then flows from said tire valve into said rubber tube and through two holes 12 extending longitudinally through said stud 7, and presses against a plunger 12', slidable in the hollow block 6, moving said plunger 12' therein against the pressure of a spring 13, coiled around a plunger rod 14 formed integral with the plunger, and compressed between the plunger and the further side of the casing 1. The inner side of said plunger engages an end of a slide piece 15 (Figure 6), the other end of which is bent outwardly and back on itself to form a neck 16, moving in a slot 17 open at the end of the block remote from the soft rubber tube 8, said neck being formed integral with a portion 18 of an angular plate 19, which can slide adjacent to two adjacent sides of the block 6. Another portion 21 of said angular plate 19 is formed into a rack, which engages a pinion 22, rotatably mounted upon a stud shaft 23 extending from the side of the block against which the rack slides, and turns said pinion. Said pinion is centrally secured within a disc 24 on the periphery of which are marked the successive numerals 3 to 11, these numerals indicating respectively the minimum and maximum pressure to which the tire is to be subjected. The disc 24 is thus caused to turn, so that each of the numerals 3 to 11 in succession appears through a circumferentially elongated slot 26 formed in the cap, a celluloid disc 27 being, however, fitted tightly in the cap to prevent the entrance of dust into the cylindrical casing.

When communication is provided between the interior of the tire and the pressure gauge by means of the tire valve, the magnitude of the pressure is indicated by the appearance of one of the numerals 3 to 11 through the slot 26 opposite to a mark 30 on the cap. When said communication is broken, the plunger is returned to its normal position by the spring 13, but the rack is not returned therewith, and therefore the same numeral continues to appear through the slot. Since the angular plate 19 with the parts 15, 18 and 21 thereon is of light construction, when the plunger returns to normal position, the weight of the plate is not sufficient to cause it to return and the plate is therefore held by frictional engagement in the position to which it has been moved by the plunger. The disc can be returned to its original or normal position by means of a pin 31 extending through a central hole in the screw cap and having its inner end entering a hole in the center of the disc and also having a head 33 by which it and the disc may be turned by the hand.

In Figure 7 I show a modification of the invention in which the disc is automatically returned to its normal position when the tire pressure is removed from the pressure gauge. This is done by providing the slide piece 15 with an inwardly extending lug 34, which can be engaged by a coil of the spring 13, so that said slide piece and the rack 19 reciprocate with the spring.

In Figure 8 is illustrated a modification of the invention in which the stud 7 is threaded and is screwed into a threaded end of the valve 36.

I claim:—

1. The combination of a hollow block having a part projecting therefrom adapted to impinge against the needle of a tire valve to open said valve and apertured to permit air to flow from the tire into said block, a plunger in said block arranged to move by the pressure of the air flowing into said block, said block having a longitudinal slot in a side thereof, a slide piece having a neck extending through said slot, one part of said slide piece being arranged to be engaged by said plunger to be moved thereby, a portion of the slide piece outside the block being in the form of a rack, a pinion rotated by said rack, and a rotatable device rotated by said pinion to indicate the movement of the plunger.

2. The combination of a hollow block having a part projecting therefrom adapted to impinge against the needle of a tire valve to open said valve and apertured to permit air to flow from the tire into said block, a plunger in said block arranged to move by the pressure of the air flowing into said block, said block having a longitudinal slot in a side thereof, a slide piece having a neck extending through said slot, one part of said slide piece being arranged to be engaged by said plunger to be moved thereby, a portion of the slide piece outside the block being in the form of a rack, a pinion rotated by said rack, and a disc rotated by said pinion and having thereon indicating marks to indicate the movement of the plunger.

3. The combination of a hollow block having a part projecting therefrom adapted to impinge against the needle of a tire valve to open said valve and apertured to permit air to flow from the tire into said block, a plunger in said block arranged to move by the pressure of the air flowing into said block, said block having a longitudinal slot in a side thereof, a slide piece having a neck extending through said slot, one part of said slide piece being arranged to be engaged by said plunger to be moved thereby, a portion of the slide piece outside the block being in the form of a rack, a pinion rotated by said rack, a disc rotated by said pinion and having thereon indicating marks to indicate the movement of the plunger, and a casing for said disc having an aperture therethrough, through which one of said marks may be observed to ascertain the extent of movement of the plunger.

AMOS S. MARCHUS.